United States Patent [19]

Isozaki

[11] Patent Number: 4,776,724
[45] Date of Patent: Oct. 11, 1988

[54] FLOATING WAVE DISSIPATION STRUCTURE

[75] Inventor: Soichiro Isozaki, Tsu, Japan

[73] Assignee: Nippon Kokan Kabushiki Kaisha, Tokyo, Japan

[21] Appl. No.: 88,730

[22] Filed: Aug. 24, 1987

Related U.S. Application Data

[63] Continuation of Ser. No. 859,789, May 5, 1986, abandoned.

[51] Int. Cl.$^4$ .............................................. E02B 3/06
[52] U.S. Cl. ........................................ 405/27; 405/28; 405/26
[58] Field of Search ............... 405/21, 23, 26–28, 405/30, 33, 35, 63, 70, 71; 114/249, 250

[56] References Cited

U.S. PATENT DOCUMENTS

| 436,644 | 9/1890 | White | 405/27 |
| 2,584,867 | 2/1952 | Guarin | 405/28 X |
| 3,991,576 | 11/1976 | Tazaki et al. | 405/21 |
| 4,174,185 | 11/1979 | Toki | 405/27 |

FOREIGN PATENT DOCUMENTS

| 83713 | 5/1983 | Japan | 405/26 |
| 91208 | 5/1983 | Japan | 405/27 |
| 829763 | 5/1981 | U.S.S.R. | 405/26 |
| 1435780 | 5/1976 | United Kingdom | 405/26 |

Primary Examiner—Randolph A. Reese
Assistant Examiner—John A. Ricci
Attorney, Agent, or Firm—Moonray Kojima

[57] ABSTRACT

A floating wave dissipation structure comprising tandem connected floating bodies separated by one or more rigid rods having a pivotally securing mechanism at the connection near the bottom of the body side wherein the structure is floated on the sea so that the tandem connected floating bodies are arranged along the direction of the waves.

2 Claims, 1 Drawing Sheet

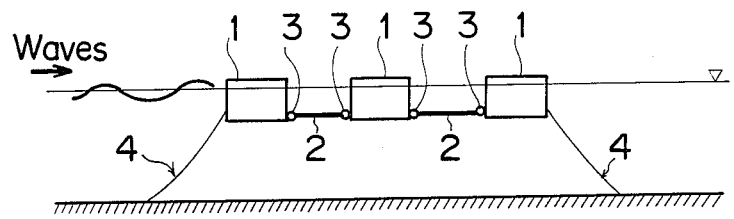
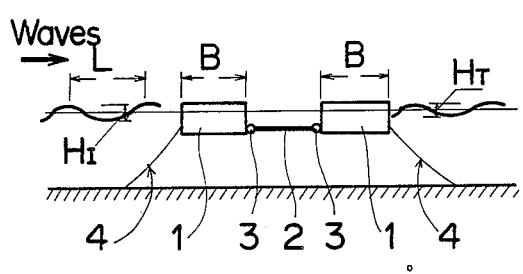
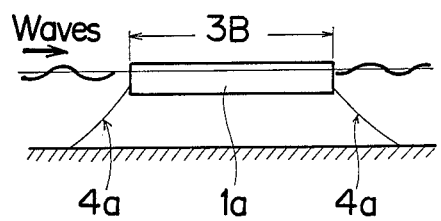
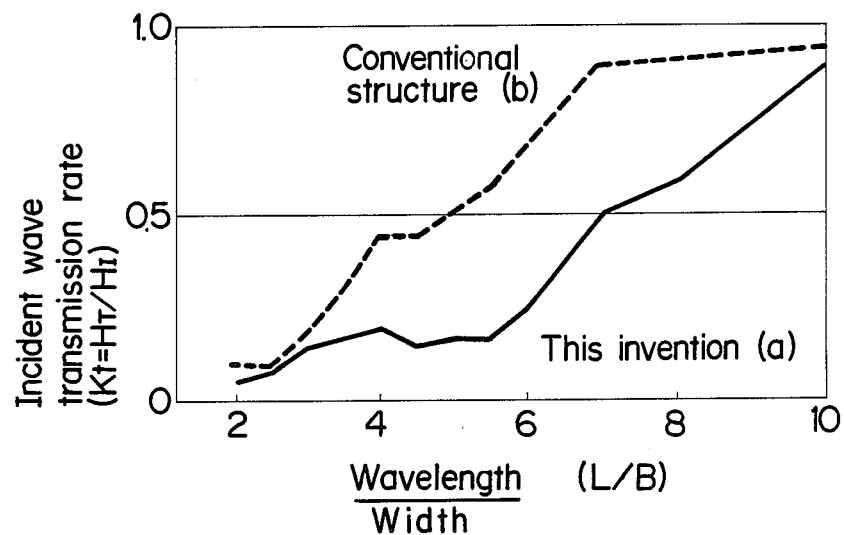

FLOATING WAVE DISSIPATION STRUCTURE

This application is a continuation of application Ser. No. 859,789, filed May 5, 1986, now abandoned.

BACKGROUND OF THE INVENTION

This invention relates to a floating wave dissipation structure.

A conventional wave dissipation structure can be largely classified into a fixed type and a floating type. The fixed type breakwater is built by a foundation on the bottom of the sea to perform a certain amount of wave breaking effect but disadvantageously requires a rigid foundation to build the breakwater. Moreover, disadvantageously, when the depth of the sea is deep, there arises a problem that the construction cost increases. The fixed breakwater interrupts the interchange of the sea water between the open sea and the inland sea surrounded by the breakwater, thus causing another problem, namely that the contamination of the inland sea is accelerated. In the case of the floating type, the problem of the foundation and the like does not exist, and the construction cost is lower than the fixed type. Thus, the floating type has been recently more noticed.

However, the floating type has a large drawback, namely, that, when the period of the incident waves is long, the wave dissipating effect of the floating type abruptly descreases. Floating bodies having large sectional area (i.e. the dimension in the direction of the waves) are required to dissipate the waves having long period of swells, thereby causing an increase in cost.

This invention is made to eliminate the problems of the conventional floating type wave dissipation structure and to provide a floating wave dissipation structure which can effectively dissipate the waves having a long period without necessity of a floating body having a large sectional area.

SUMMARY OF THE INVENTION

According to a feature of the present invention, there is provided a floating wave dissipation structure which comprises tandem connected floating bodies separated by a predetermined distance, one or more rigid rods for connecting between adjacent floating bodies in such a manner that the connecting part has a pivotally securing mechanism, wherein the structure is set up on the sea so that the tandem connected floating bodies are arranged following the direction of the waves.

In this structure, the tandem connected floating bodies move against the incident waves, interacting with each other while holding the distance between the bodies constant. Since the motion has a phase lag with respect to the incident wave, the waves generated by the motion cancel the incident waves to thereby dissipate the waves. In addition, since the structures are tandem connected and hence can provide sufficient dimension against the waves, the invention produces efficient wave dissipating effect for waves having a long period in addition to waves of shorter periods.

An explanation will be made to an embodiment of the invention with reference to the attached drawings.

BRIEF DESCRIPTION OF THE DRAWINGS

FIG. 1 is an explanatory view showing an embodiment of this invention;

FIG. 2 is a graph showing the comparison of the wave dissipating effect of the embodiment of the wave dissipation structure of this invention with that of the conventional structure.

FIGS. 3(a) and 3(b) are explanatory views showing the wave dissipating structure used in FIG. 2, wherein FIG. 3(a) is the structure of this invention, and FIG. 3(b) is the conventional structure.

DETAILED DESCRIPTION OF THE PREFERRED EMBODIMENT

FIG. 1 shows an embodiment of this invention. The floating wave dissipation structure comprises tandem connected floating bodies separated by predetermined distance, and one or more rigid rods 2 for connecting the floating bodies 1. The ends of the rod 2 are respectively connected at the lower positions of each body as depicted. The connecting part 3 has a pivotally securing mechanism, so that each floating body 1 is able to rotate with respect to the rod 2.

The floating body 1 can employ a suitable structure capable of floating on the sea.

The floating body of the floating wave dissipation structure constructed as described above comprises tandem connected floating bodies 1 arranged in the direction of the wave, and is moored by one or more mooring units 4 (anchoring cables or chains) on the sea having a predetermined draft in the same manner as the conventional floating wave dissipation structure. The mooring units 4 are respectively connected to the floating bodies 1 at both ends of the structure and to the bottom of the sea.

The tandem connected floating bodies can be individually moved through the connecting parts 3 having the pivotally securing mechanism, and the floating bodies 1 are moved with respect to the incident waves, interacting with each other while holding the distance constant by the rods 2. The motion of each floating body 1 has a phase lag with respect to the incident waves, and the waves produced by the motion cancel the incident waves, thereby obtaining effective wave dissipating effect.

In addition, the tandem connected floating bodies 1 are connected to obtain sufficient dimension of the combined bodies and rods with respect to the wave length of the incident waves while suppressing the sectional area (i.e. the dimension in the direction of the waves) of the individual bodies to a small value. Thus, the floating wave dissipation structure of this invention can effectively dissipate the waves having a long period that have been difficult by the conventional wave dissipation structure.

FIG. 2 shows the comparison of the wave dissipating effect of the wave dissipating structure of this invention with that of the conventional structure in respect to the wave dissipating effect (the transmission ratio of the incident wave:Kt). In FIG. 2, the effects of the wavelength (see FIG. 3(A)) to length (B) of the float (see FIG. 3(a)) ration (L/B) upon the incident wave transmission rate $K=H_T/H_I$ is shown. The ratio L/B between 2 and 10 results in a transmission rate of between slightly above zero to about 0.9, and between 2 and 7 which results in a transmission rate of between slightly above zero to about 0.5. For example, if the L/B ratio is 7, then the height of the waves before dissipation ($H_I$) is reduced to ½ (i.e. 0.5) after breaking up by the apparatus (i.e. $H_T$). FIG. 3(a) shows the structure in which two floating bodies 1 are connected in this invention, and the conventional structure shown in FIG. 3(b) has a body 1a having a width 3B (the width of each body is B) moored by mooring unit 4a. In FIG. 3(a), the wavelength is denoted L, the length dimension of the float 1 in the direction (i.e. parallel to) of travel of the wave is denoted B, the height of the wave before dissipation by the invention is denoted $H_I$, and the height of the wave after dissipation by the invention is denoted $H_T$. Thus, the rate of transmission of waves through the invention apparatus ($K_t$), shown in FIG. 2, is $K_t = H_T/H_I$. Also, as depicted, the length B is defined as being in a direction which is parallel to the direction of travel of the waves, the width of the float would be in a direction perpendicular thereto, the top of the float is that surface which is floating exposed to the air, and the bottom of the float is that surface which is submerged in water. The ends of the float are those parallel surfaces which are perpendicular to the direction of travel of the waves and are in the width direction.

As apparent from FIG. 2, the wave dissipating effect of the wave dissipating structure of this invention is remarkably improved as compared with the conventional structure, and it can be understood from FIG. 2 that the structure of this invention can particularly obtain preferable wave dissipating effect for waves having a relatively long period.

According to this invention as described above, efficient wave dissipating effect can be obtained for not only waves having a short period and a middle period but also waves having a relatively long period, and since the body having a large sectional area (i.e. dimension in the direction of the waves) is not necessary, the floating wave dissipation structure of this invention has such advantages that it can be inexpensively manufactured and installed.

What is claimed is:

1. A floating sea wave dissipation structure for breaking waves of sea water having a particular wavelength, said structure comprising
    a plurality of substantially similarly dimensioned elongated floats, each having in cross-section a rectangular geometric shape with a top elongated length dimension and disposed parallel thereto a bottom elongated length dimension, and a front width dimension and a back width dimension, said front and back width dimensions being perpendicular to the top and bottom length dimensions;
    a plurality of elongated rigid rods;
    means for rotatively connecting only the ends of said rigid rods directly between substantially the bottom length dimension at said front width dimension and substantially the bottom length dimension at said back width dimension of next adjacent floats to form a chain of the plurality of floats as interconnected by said rigid rods, extending in a direction in parallel with the direction of travel of the waves, with the rods being disposed completely under the surface of the water and so that each float rotates independently of each other; and
    a pair of elongated mooring chains for connecting the ends of the chain of the plurality of floats connected by the rigid rods to the sea bottom with the length dimension of each float being parallel to the direction of travel of the waves and with the elongated mooring chains extending substantially parallel with the extended direction of the elongated rods;
    whereby each float is moved by the waves so as to rotate independently with respect to each other at the distance of the length of the rigid rods, thereby to break the waves by motion of the floats with respect to each other.

2. The structure of claim 1, wherein the wavelength of the waves divided by the length dimension of the floats is between 2 and 7, and the wave transmission is between slightly above zero and 50%.

* * * * *